W. EICKHOFF.
MECHANICAL MOVEMENT.
APPLICATION FILED FEB. 18 1918.

1,288,851.

Patented Dec. 24, 1918.
3 SHEETS—SHEET 1.

WITNESSES:

INVENTOR.
Wm Eickhoff
H. J. Sanders
ATTORNEY

W. EICKHOFF.
MECHANICAL MOVEMENT.
APPLICATION FILED FEB. 18 1918.

1,288,851.

Patented Dec. 24, 1918.
3 SHEETS—SHEET 2.

WITNESSES:
INVENTOR.
Wm Eickhoff
BY
H. J. Sanders
ATTORNEY

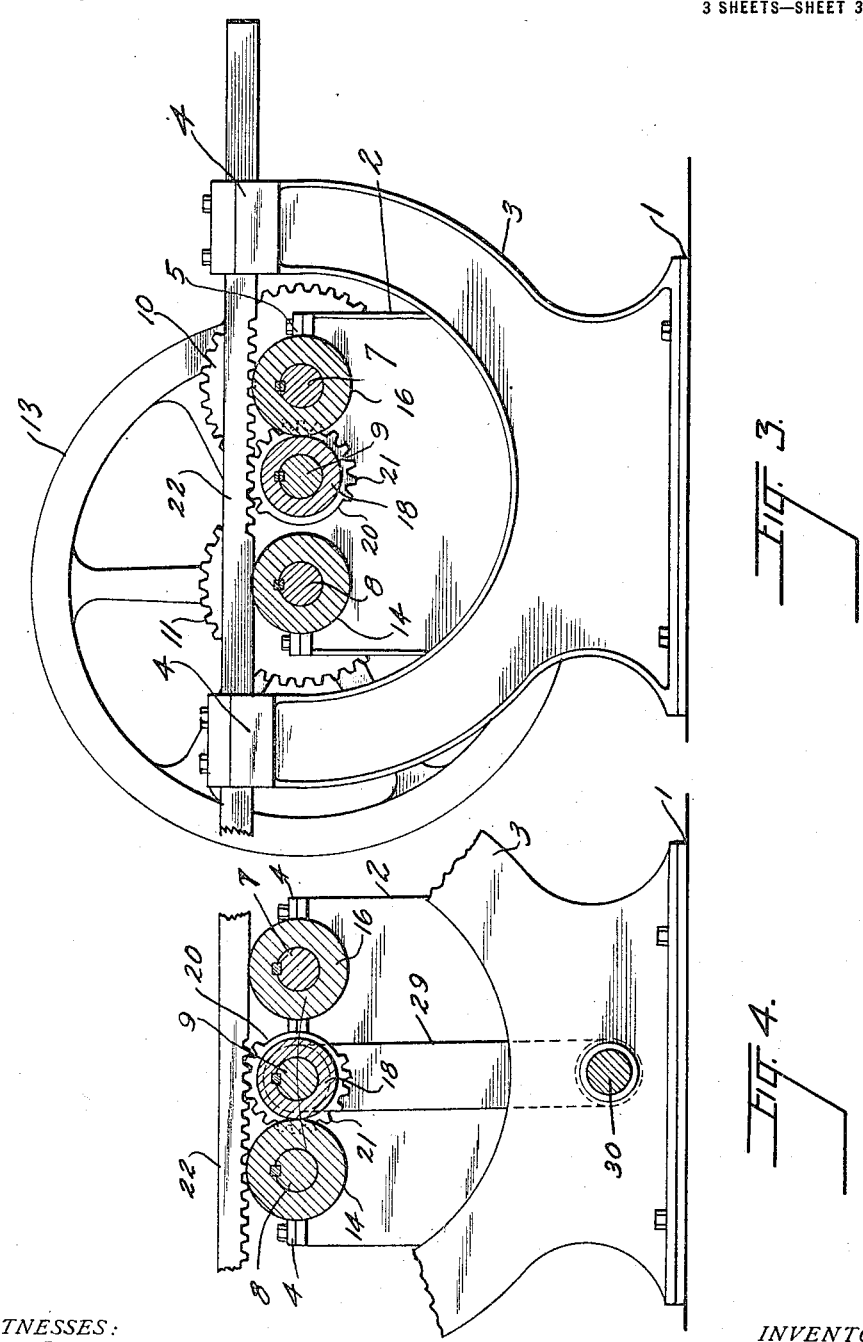

UNITED STATES PATENT OFFICE.

WILLIAM EICKHOFF, OF NATOMA, KANSAS.

MECHANICAL MOVEMENT.

1,288,851.   Specification of Letters Patent.   Patented Dec. 24, 1918.

Application filed February 18, 1918. Serial No. 217,918.

*To all whom it may concern:*

Be it known that I, WILLIAM EICKHOFF, a citizen of the United States, residing at Natoma, in the county of Osborne and State of Kansas, have invented certain new and useful Improvements in Mechanical Movements, of which the following is a specification.

This invention relates to improvements in mechanical movements and the prime object of my invention is to provide better means for converting reciprocating motion into rotary motion or the opposite. A further object is to provide means whereby the whole power that causes the movement of a crank or piston may be utilized as a driving power, the usual loss of power upon the return movement of the crank or piston being eliminated. With the foregoing and other objects in view the invention consists in the combination and arrangement of parts to be hereinafter fully described, pointed out in the appended claims and illustrated in the accompanying drawings which form a part of this specification and in which—

Fig. 3 is a fragmentary sectional view taken on line 3—3 of Fig. 1.

Fig. 4 is a fragmentary sectional view of a slightly modified form of the invention.

Like reference characters denote corresponding parts throughout the several views.

Figure 1:
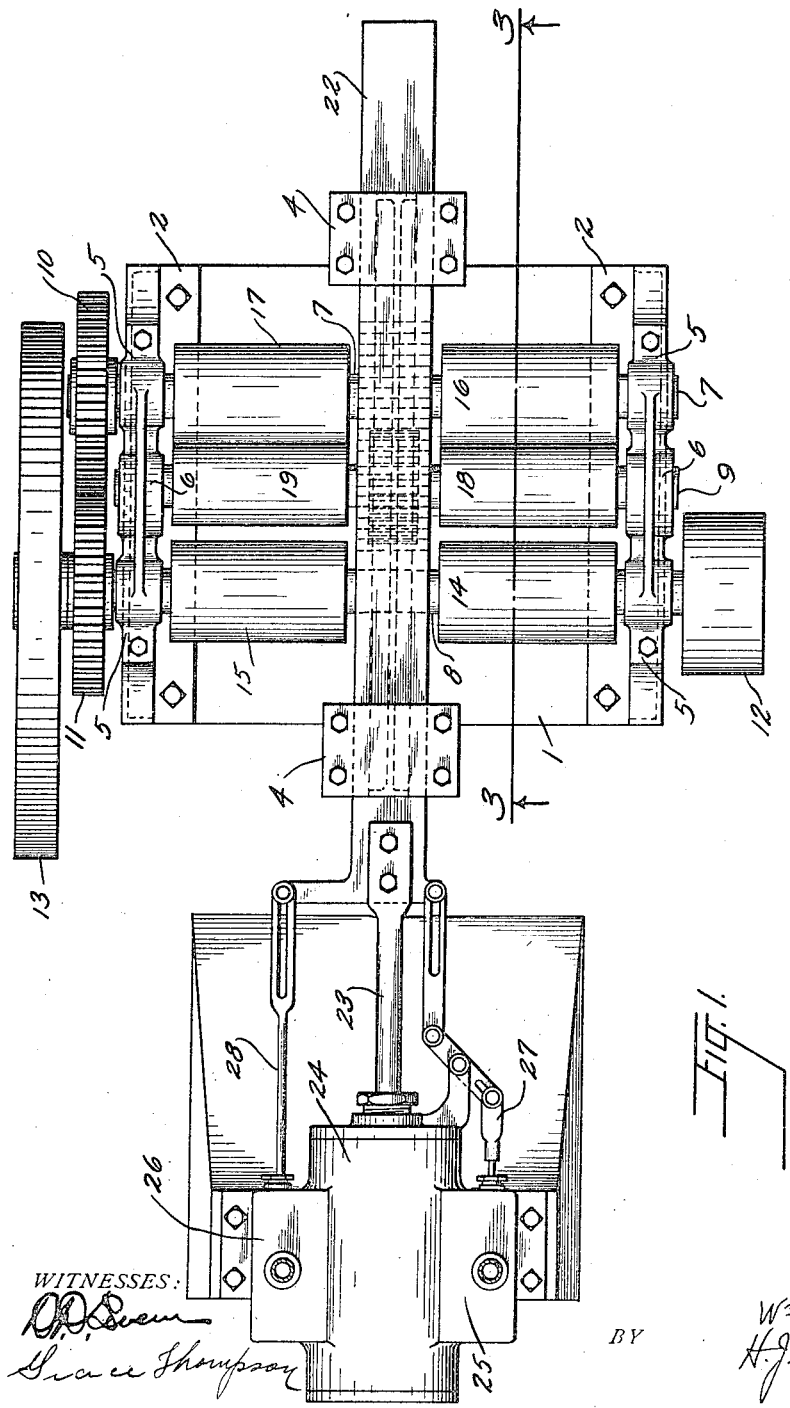
Figure 1 is a top plan view of one embodiment of my present invention.
Figure 2:
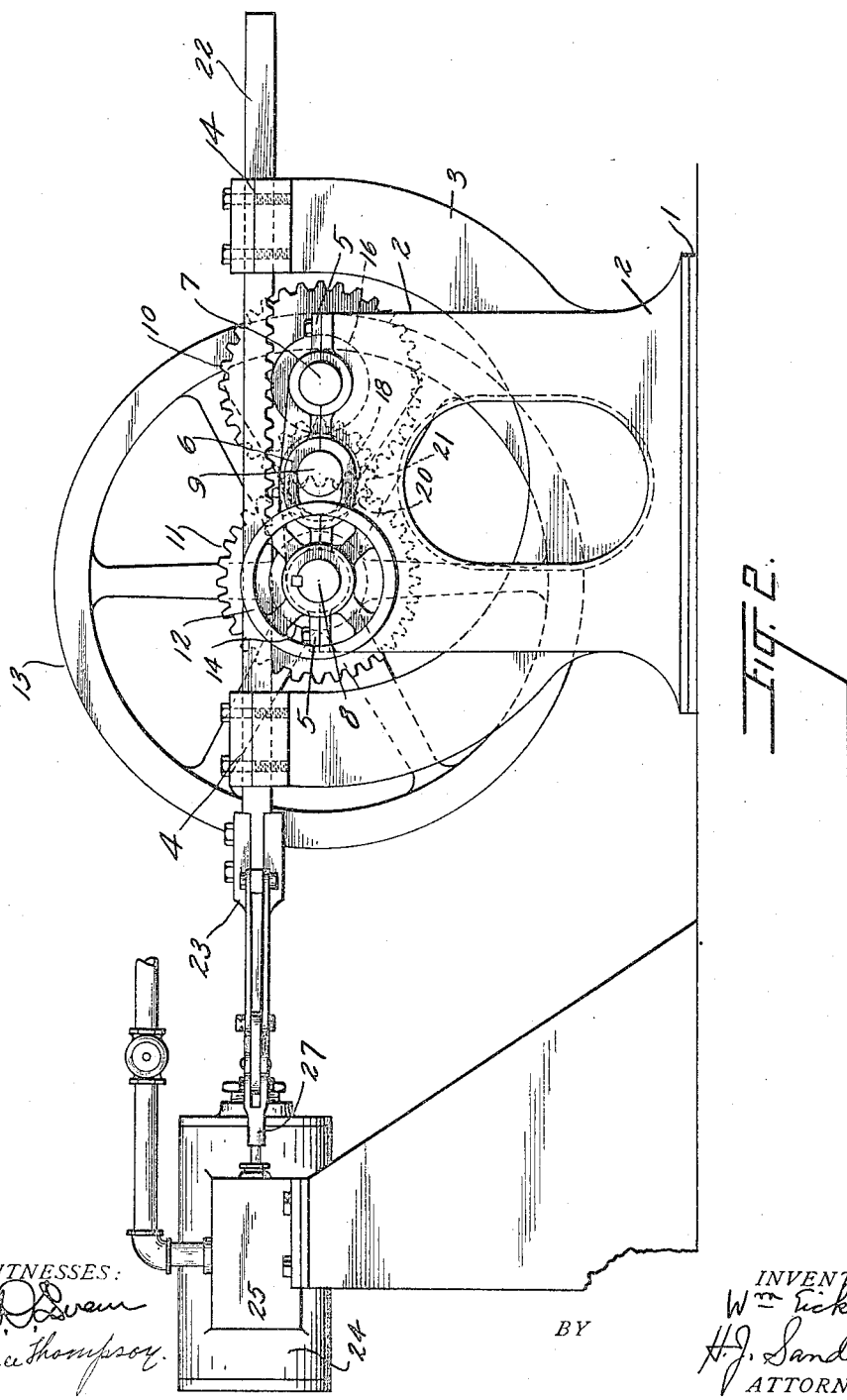
Fig. 2 is a view of the same in side elevation.

My invention comprises a base or bed plate 1 to which the laterally disposed uprights 2 are secured and between which the upright 3 formed with bearings 4, 4 is disposed also upon the said bed plate. The uprights 2 provide bearings 5, 6, the bearings 5 carrying the shafts 7, 8 and the bearings 6 carrying a shaft 9 capable of longitudinal movement relative to its bearings. The shafts 7, 8 are projected beyond their bearings and carry, respectively, the meshing gears 10, 11, the shaft 8 carrying also a drive pulley 12 at one extremity and a fly wheel 13 at its opposite extremity. The said shaft 8 is further provided with the spaced friction rollers 14, 15 which are preferably keyed thereto and the shaft 7 is provided with similar spaced friction rollers 16, 17. The intermediate relatively movable shaft 9 is provided with the spaced friction rollers 18, 19 and between the same with the partially toothed wheel or segment 20, the teeth 21 of which are in mesh with the teeth of a reciprocating rack 22 carried in the said bearings 4, 4. The said reciprocating rack 22 is connected directly to the piston 23 of the engine cylinder 24 which may be provided with the intake valve 25 and exhaust valve 26 which valves are connected, respectively, by the control rods 27, 28 suitably connected to the said reciprocating rack.

Referring particularly to Fig. 4 a slightly modified form is shown. The shaft 9 instead of being disposed in enlarged bearings is journaled in the rocking arms 29 fast upon a rock shaft 30 journaled in the uprights 2, 2, 3. In operation the piston 23 reciprocates the rack 22 which is in mesh with the teeth 21 of the partially toothed gear 20. Movement of the piston in one direction will cause the rack 22 to shift the shaft 9 toward the shaft 7 until the friction rolls of said shafts engage and the latter shaft is driven thereby. The return movement of the piston 23 will move the rack 22 in the opposite direction and so move the shaft 9 toward the shaft 8 causing the rolls 18, 19 to engage with the rolls 14, 15 thus driving the said shaft 8. Since the gears 10, 11 are always in mesh the shafts 7, 8 will be driven positively by both strokes of the piston 23 thus enabling the pulley 12 to transmit maximum power to the work to be driven.

What is claimed is:—

1. In combination with a piston, a reciprocating rack bar, a pair of rotary shafts spaced apart, toothed wheels terminally carried by said rotary shafts and in mesh with each other, a pulley terminally carried by one of said rotary shafts, a third rotary shaft arranged between the aforesaid spaced rotary shafts and movable relatively thereto for engagement with either of the same, and a toothed segment fast upon said third rotary shaft and in mesh with the said reciprocating rack bar.

2. In combination with a piston, a reciprocating rack bar, a pair of rotary shafts spaced apart, power transmission means connecting said spaced rotary shafts, a pulley terminally carried by one of said rotary shafts, a third rotary shaft arranged between the said spaced rotary shafts and capable of relative movement in the common plane of said spaced rotary shafts, and means operatively connecting said third rotary shaft and the said rack bar whereby said third rotary shaft may be rotated and moved alternately into frictional engagement with the said spaced rotary shafts.

3. In combination with a piston, a reciprocating rack bar, a pair of rotary shafts spaced apart, spaced friction rolls keyed to each of said shafts, toothed wheels terminally carried by said rotary shafts and in mesh with each other, a pulley terminally carried by one of said rotary shafts, a third rotary shaft arranged between the aforesaid spaced rotary shafts and movable relatively thereto, spaced friction rolls keyed to said third rotary shaft and capable of engagement with the rolls of the said spaced rotary shafts, and a toothed segment fast upon said third rotary shaft and in mesh with the said reciprocating rack bar.

In testimony that I claim the foregoing as my own I have hereto affixed my signature in the presence of two subscribing witnesses.

WM. EICKHOFF.

Witnesses:
ERNST EICKHOFF,
AMANDA EICKHOFF.

Copies of this patent may be obtained for five cents each, by addressing the "Commissioner of Patents, Washington, D. C."